(12) United States Patent
Hisi

(10) Patent No.: US 6,719,476 B2
(45) Date of Patent: Apr. 13, 2004

(54) CONSTRUCTION IN REACTION ROD

(75) Inventor: Roberto Hitoshi Hisi, Sao Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 29 days.

(21) Appl. No.: 10/020,276

(22) Filed: Dec. 18, 2001

(65) Prior Publication Data
US 2002/0074757 A1 Jun. 20, 2002

(30) Foreign Application Priority Data
Dec. 18, 2000 (BR) .............................................. 0006509

(51) Int. Cl.$^7$ ................................................. F16C 11/00
(52) U.S. Cl. ...................... 403/137; 403/122; 403/135; 280/93.511
(58) Field of Search ................................. 403/122, 128, 403/130, 137, 135, 148; 280/93.51, 93.511; 74/579 R; 384/215, 220, 222, 536, 582

(56) References Cited

U.S. PATENT DOCUMENTS

| | | | | |
|---|---|---|---|---|
| 4,430,016 A | * | 2/1984 | Matsuoka et al. | 403/40 |
| 4,564,307 A | * | 1/1986 | Ito | 403/140 |
| 5,931,597 A | * | 8/1999 | Urbach | 403/134 |
| 6,171,012 B1 | * | 1/2001 | Westphal | 403/137 |
| 6,231,264 B1 | * | 5/2001 | McLaughlin et al. | 403/76 |
| 6,254,114 B1 | * | 7/2001 | Pulling et al. | 280/93.511 |

* cited by examiner

Primary Examiner—Lynne H. Browne
Assistant Examiner—Michael P. Ferguson
(74) Attorney, Agent, or Firm—Liniak, Berenato & White

(57) ABSTRACT

An assembly for a reaction rod for shafts of automotive vehicles, more specifically, to be applied in heavy vehicles provided with pneumatic or mixed suspension, basically composed of a box provided in the end of a bar, being that this box has an internal housing in the cylindrical or spherical form where is introduced a pin with a segment also cylindrical or spherical, where is a vulcanized rubber confectioned by injection and the pin is fixed in the interior of the box by retaining rings. The reaction rod thus composed has in the injected rubber that is vulcanized in the cylindrical or ball type segment of the pin, a recess or channel that in a version is provided in the entire circumference of the injected rubber that is vulcanized on the pin, with the objective of providing a relief in small radial and angular movements, in all senses of direction, which relief is progressively reduced in the proportion that the radial and angular movement increases. In a second version, the recess or channel provided in the circumference of the injected rubber is segmented so as to allow the relief that is progressively reduced in the radial and angular movement, only in specific directions, being that in other directions also specific where the recesses or channels are not provided in the injected rubber, there is no relief and the displacement effort is uniform as from the geometrical shaft of the cylindrical or ball type pin relative to the box of the reaction rod until its displacement limit.

5 Claims, 4 Drawing Sheets

CONSTRUCTION IN REACTION ROD

BACKGROUND OF THE INVENTION

1. Field of the Invention

This invention refers to a constructive form of a reaction rod to be applied to the suspension system of automotive vehicles, more specifically, to heavy vehicles provided with pneumatic or mixed suspension systems.

2. Description of Related Art

The reaction rods of the vehicular suspension systems are composed, basically, of a box with a housing in its interior, of cylindrical or spherical shape, in which is inserted a pin provided with a segment also of cylindrical or spherical shape, where vulcanized rubber is provided in the interior housing of the box. After the insertion of the pin with vulcanized rubber in the interior housing of the box, the pin is fixed with retaining rings that prevent its lateral displacement, resulting in a joint, called molecular joint. The box of the molecular joint is provided on the end of a bar that is fixed to the chassis of the vehicle, being that the pin with vulcanized rubber placed in its interior, has opposite extensions that are projected towards the outside of the box, to be fixed to the shaft of the vehicle. The system aims to maintain the projected geometry of the shaft relative to the chassis.

The above described fixing may if desired be inverted, but with the same purpose of maintaining the projected geometry of the shaft relative to the chassis. The molecular joint of the reaction rod provides to the shaft, when it is operating, radial, angular and rotational movements, relative to the box, but always returning it to its original assembling position when the operational effort is relieved. These reaction rods to the shaft, however, need a load of displacement progressively greater when the displacement effort of the shaft is lateral relative to the chassis. This progressiveness must occur in the proportion that the shaft is displaced laterally and this from its central position until the lateral limit of displacement.

To obtain this effect, the state of the art applied to the center of the interior housing of the box, and to its entire circumference, a recess or channel created by a machining process that provides to the vulcanized rubber on the ball or cylindrical type pin a relief of the displacement load, when the same is in its original assembling position, that is, centered. Having in view that the lateral walls of the interior housing of the box, through which are projected the ends of the ball or cylindrical pin, do not have this recess or channel, a result is that the system causes a smaller displacement effort to the short radial and angular-lateral movements, resulting that this effort progressively increased in the proportion that the lateral angularity of the displacement increases. In this manner, the targeted objective of establishing a progressive increase of load so as to resist to the effort of lateral displacement of the shaft relative to the chassis is attained.

However, in spite of being efficient in the desired effect, this construction set forth in the state of the art presents certain complexities and involves high costs in the manufacturing process, loss of material, etc.

SUMMARY OF THE INVENTION

The objective of this invention is to eliminate these inconveniences by providing to the system a simple and low cost construction, besides making possible construction variants that produce the effect of progressiveness of load in specific angles of the shaft, as desired in the project of the vehicle.

To attain this objective, this invention provides the usual machining in the interior housing of the reaction rod box, without any recess or central channel, but produces the requisite relief, through a recess or channel in the vulcanized rubber itself, to the ball or cylinder type pin, during the injection of the same. This construction system processes the recess or channel of the very injection mold of the rubber that is vulcanized in the pin, so as to obtain the piece ready for mounting in the injection process itself. Moreover, if it is desirable, pursuant to the project of the vehicle, that the progressive effort of lateral displacement occurs in specific angles of the shaft, this effect also is easily obtained by providing the injection mold with segments of recess or channels only at the points at which the relief is desired.

BRIEF DESCRIPTION OF THE DRAWINGS

The attached drawings show two preferred embodiments of the invention, in which.

DETAILED DESCRIPTION OF PREFERRED EMBODIMENTS

Figure 1:
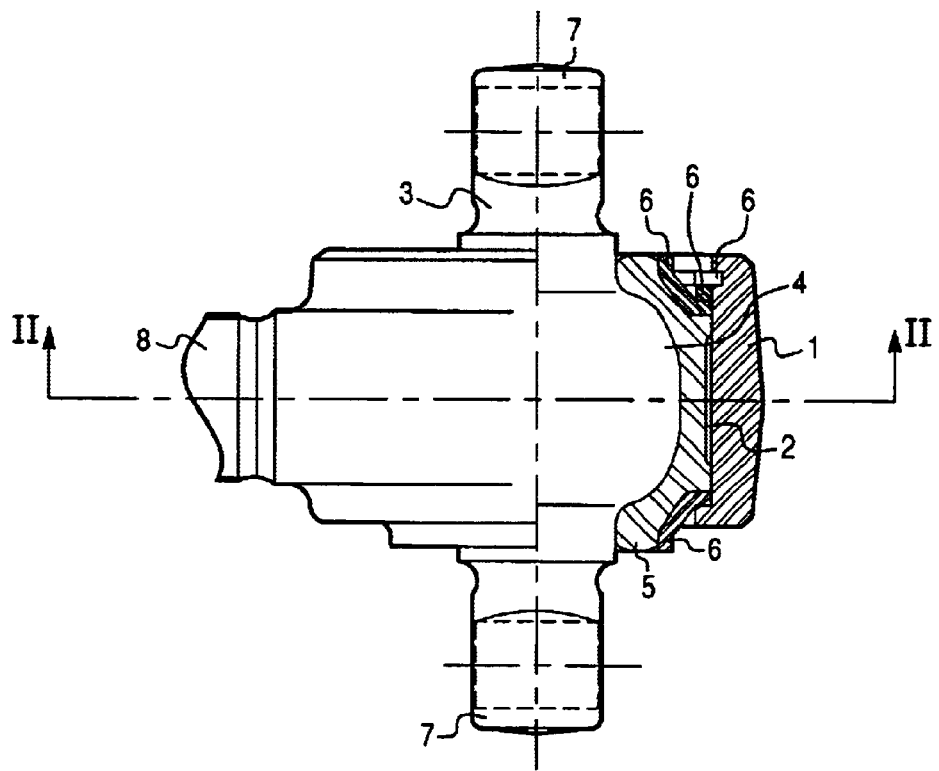
FIG. 1 shows in partial cross-section a first embodiment of the molecular joint of the reaction rod, when assembled, with relief at all the angles.
Figure 2:
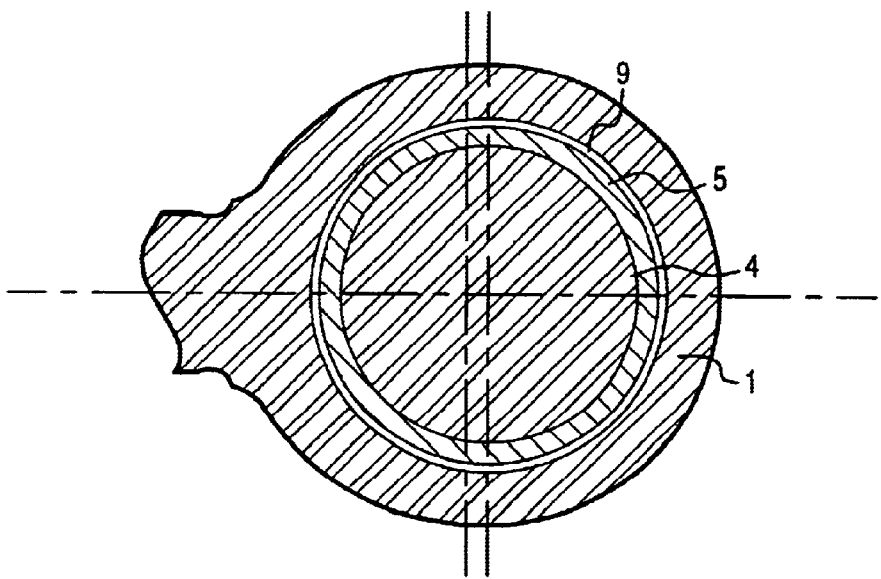
FIG. 2 shows the II—II cross-section of FIG. 1 of the molecular joint of the reaction rod, also mounted.

Thus, as it is seen in the attached drawings, the reaction rod for the shaft is composed of the box 1 with an interior housing 2, in which is inserted a pin 3 that has a cylindrical segment 4 where vulcanized rubber 5 is provided with the format of the interior housing 2 of the box 1. Retaining rings 6 are provided to fix the pin 3 with the vulcanized rubber 5 in the interior housing 2 of the box 1. The pin 3 has opposite extensions 7 that are projected to the outside of the box 1, which box 1 is an integral part of the end of the bar 8 that is fixed to the chassis of the vehicle, while the ends 7 of the cylindrical pin 3 are fixed to the third shaft of the vehicle or vice-versa.

Figure 3:
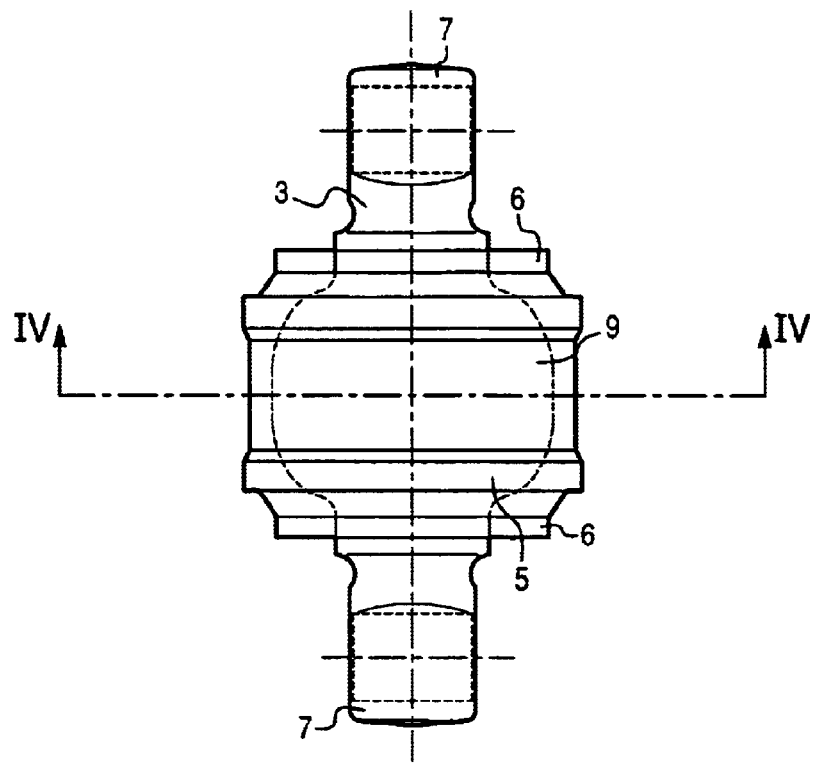
FIG. 3 shows the cylindrical pin with the vulcanized rubber and already molded according to this first embodiment.
Figure 4:
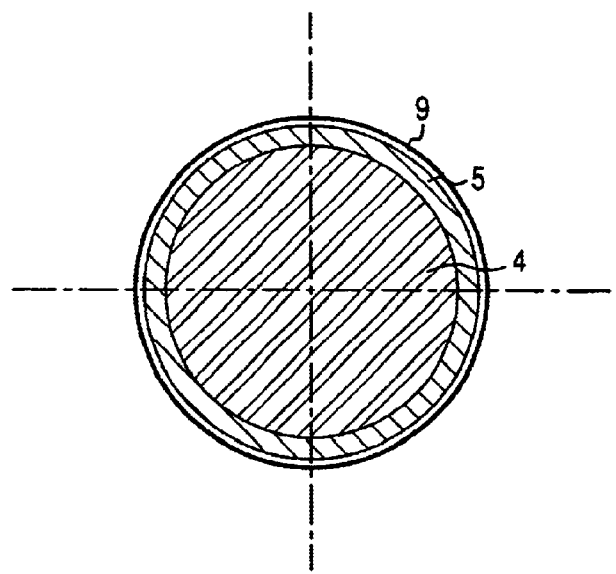
FIG. 4 shows the IV—IV cross-section of FIG. 3 of the cylindrical pin with the vulcanized rubber, of this first embodiment.
Figure 5:
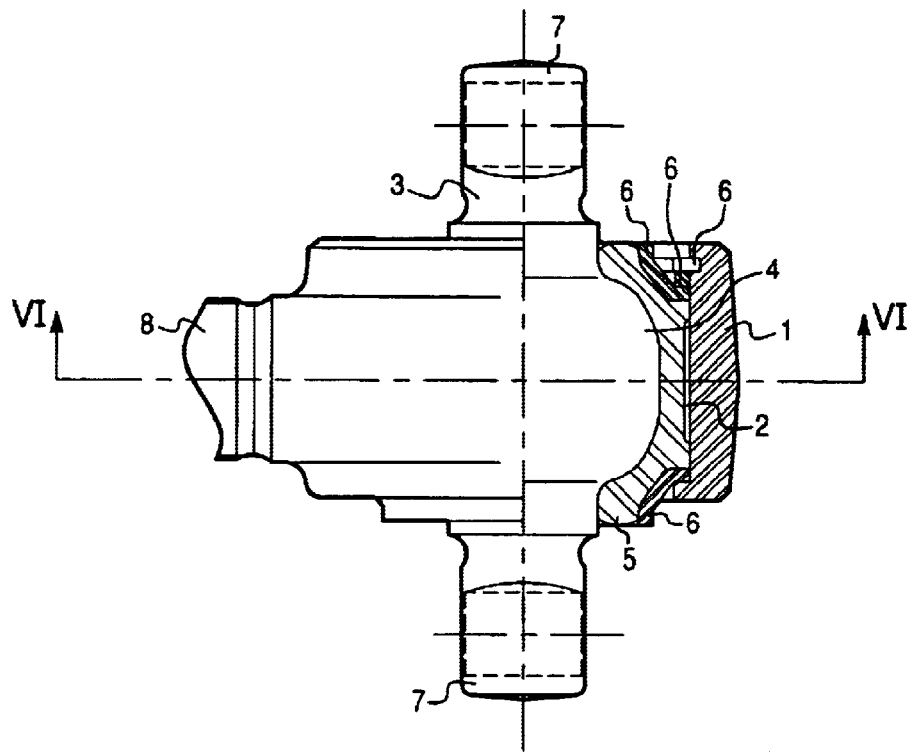
FIG. 5 shows in partial cross-section a second embodiment of the molecular joint of the reaction rod, mounted, with relief in specific angles.
Figure 6:
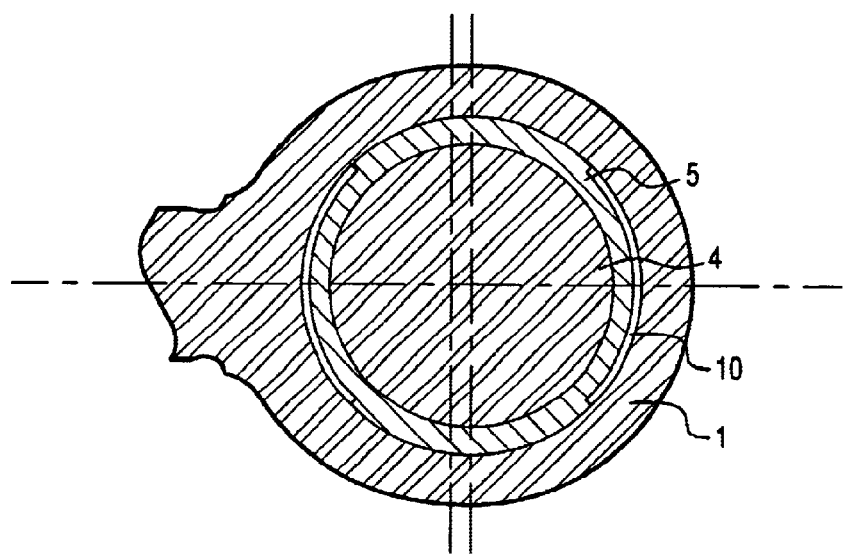
FIG. 6 shows the VI—VI cross-section of this second embodiment of FIG. 5 of the molecular joint of the reaction rod, also mounted.

In the first example of the execution that is shown by the FIGS. 1, 2, 3 and 4, the scope of the invention is presented in FIG. 3 by the recess or channel 9, in the rubber vulcanized 5 in the cylindrical segment 4 of the pin 3, and, FIG. 4 shows the cross-section IV—IV of FIG. 3 where is seen the recess or channel 9 in the entire circumference of the rubber vulcanized 5 in the cylindrical segment 4 of the pin 3. The recess or channel 9 allows an initial relief of angular and radial displacement in all directions.

Figure 7:
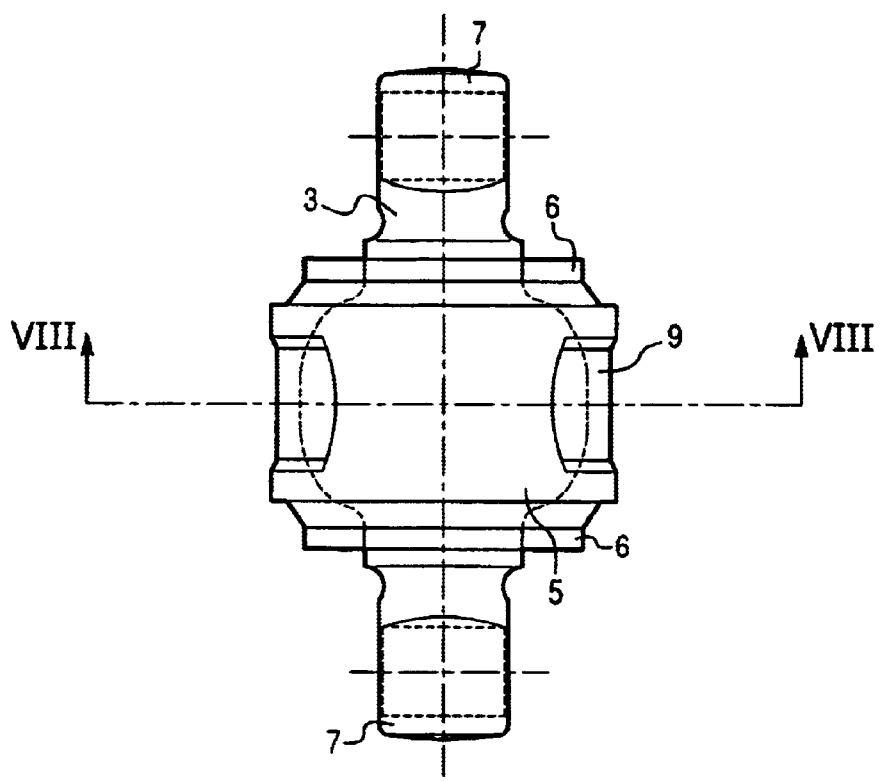
FIG. 7 shows the cylindrical pin with the vulcanized rubber and already molded according to the second embodiment.
Figure 8:
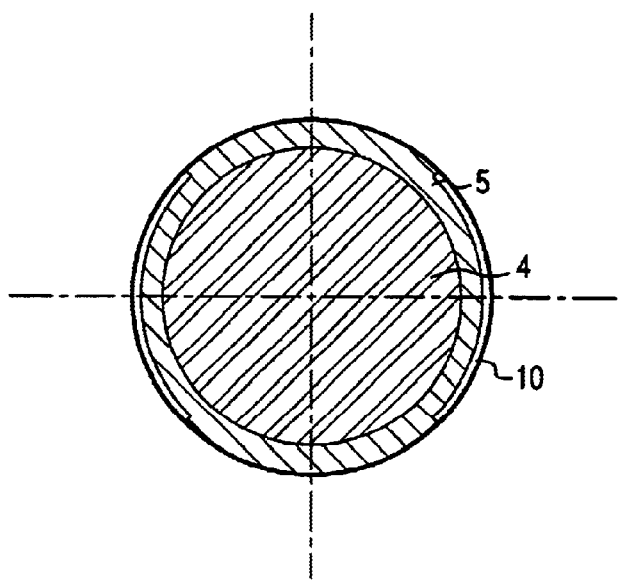
FIG. 8 shows the VIII—VIII cross-section of the cylindrical pin of FIG. 7 with the vulcanized rubber, of this second embodiment.

In the second example of the invention, as shown by FIGS. 5, 6, 7 and 8, the scope of the invention is presented in FIG. 7 by the recess or segmented channel 10, in the rubber 5, vulcanized in the cylindrical segment 4 of the pin 3, and, FIG. 8 shows the VIII—VIII cross section of FIG. 3 where is seen the recess or segmented channel 10 in the circumference of the rubber 5, vulcanized in the cylindrical segment 4 of the pin 3, that allows radial and angular relief of displacement only in the desired direction.

While the foregoing invention has been shown and described with reference to the preferred embodiments, it will be understood that various changes in form and detail may be made therein without departing from the spirit and scope of the instant invention.

What is claimed is:

1. An assembly for a reaction rod for a shaft that is applied to the suspension of automotive vehicles, comprising a bar that has at its end a box with an interior housing where is inserted a pin with an a spherical or cylindrical segment, a vulcanized rubber member manufactured by injection, wherein the vulcanized rubber member has a recess or channel, constructed in the process of injection itself, that extends its entire circumferences wherein the recess or channel defines an open void radially outside a maximum diameter of said spherical or cylindrical segment, said maximum diameter being substantially perpendicular to an axis of said pin.

2. An assembly for a reaction rod for a shaft, according to claim 1, wherein said recess or channel provides relief of small radial and angular displacement of the spherical or cylindrical segment of the pin in all directions, which relief is progressively reduced in a proportion to the radial and angular displacement of the spherical or cylindrical segment of the pin.

3. An assembly for a reaction rod for a shaft that is applied to the suspension of automotive vehicles, comprising a bar that has in its end a box with an internal housing where is inserted a pin with a cylindrical or ball type segment, a vulcanized rubber member manufactured by injection, wherein the vulcanized rubber member has recessed or segmented channels, constructed in the process of injection itself, that extend only a part of the circumference of said vulcanized rubber members, wherein the recessed or segmented channels define open voids radially outside a maximum diameter of said spherical or cylindrical segment, said maximum diameter being substantially perpendicular to an axis of said pin.

4. An assembly for a reaction rod for shaft, according to claim 3, wherein said recessed or segmented channels provide relief of small radial and angular displacement of the cylindrical or ball type segment of the pin in specific directions, which relief is progressively reduced in proportion to the displacement of the cylindrical or ball type segment of the pin.

5. An assembly for a reaction rod for shaft, according to claim 3, wherein there is no relief of radial and angular displacement of the cylindrical or ball type segment of the pin in segments of the vulcanized rubber member, in such a way that in specific directions the effort of radial and angular displacement of the cylindrical or ball type segment of the pin is maintained uniform as from its original mounting position, namely, from its geometrical axis relative to the box, until a maximum radial and angular displacement is reached.

* * * * *